No. 622,510. Patented Apr. 4, 1899.
F. P. MORNEAU.
CIRCULAR LAMP WICK TRIMMER.
(Application filed June 28, 1898.)
(No Model.)
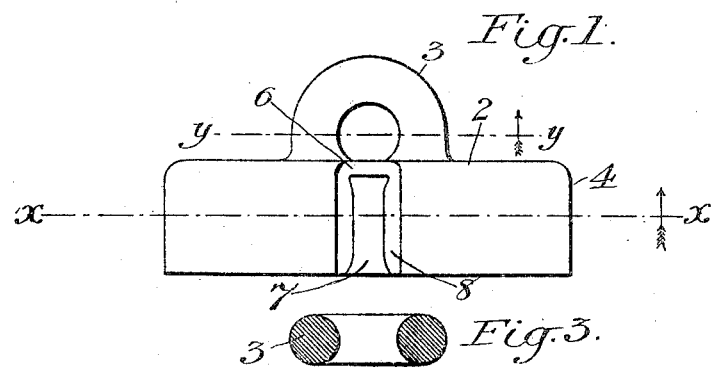
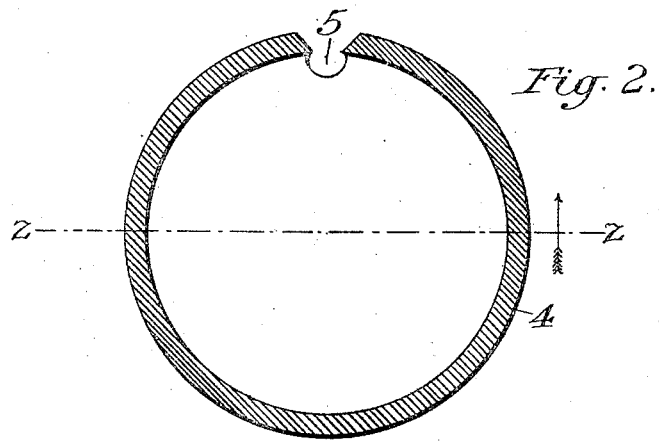
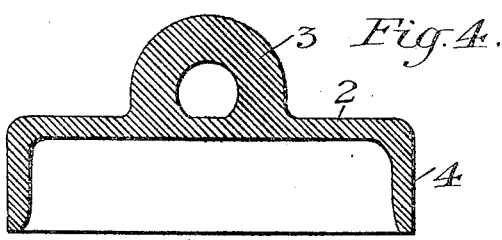
WITNESSES
Frank P. Morneau
INVENTOR
THE NORRIS PETERS CO., PHOTO-LITHO., WASHINGTON, D. C.

UNITED STATES PATENT OFFICE.

FRANK P. MORNEAU, OF PRINCETON, MINNESOTA.

CIRCULAR-LAMP-WICK TRIMMER.

SPECIFICATION forming part of Letters Patent No. 622,510, dated April 4, 1899.

Application filed June 28, 1898. Serial No. 684,690. (No model.)

*To all whom it may concern:*

Be it known that I, FRANK P. MORNEAU, a citizen of the United States, residing at Princeton, county of Mille Lacs, State of Minnesota, have invented certain new and useful Improvements in Circular-Lamp-Wick Trimmers, of which the following is a specification.

My invention relates to devices for trimming circular wicks; and the object of the invention is to provide means for quickly removing the burned or charred portion of the wick, leaving a smooth even surface, so that the flame will be uniform when the lamp is lighted.

A further object is to provide means for trimming the wick in such a manner that the fingers of the operator need not come in contact with the wick, thus rendering the device cleanly in operation.

The invention consists generally in a disk having a depending flange or skirt and a suitable handle, said disk having a slot, the edges of the slot being sharpened to engage and remove the burned portions of the wick.

Further, the invention consists in a disk having a depending flange, said flange having a slot and said disk having a recess forming a continuation of said slot, and the sides of said slot and recess being brought to a sharpened edge, whereby when the device is revolved the burned portions on the sides and the top of the wick will be removed.

Further, the invention consists in various constructions and combinations, all as hereinafter described, and particularly pointed out in the claims.

In the accompanying drawings, forming part of this specification, Figure 1 is a side elevation of a lamp-trimmer embodying my invention. Fig. 2 is a horizontal section on the line $x\ x$ of Fig. 1. Fig. 3 is a horizontal section on the line $y\ y$ of Fig. 1. Fig. 4 is a vertical section on the line $z\ z$ of Fig. 2.

The device consists, as shown in the drawings, of a disk 2, preferably of metal, having a handle 3 upon its upper surface to be grasped by the fingers of the operator, and at its outer edges provided with an annular depending flange or skirt 4, preferably formed integrally with the disk; but it may be made independently and secured to the disk, if preferred. The disk is substantially the size of the top of the burner using a circular wick, and the flange or skirt is provided with a recess 5, the sides of the recess being drawn down to a knife-edge 6, and said recess communicates with a vertical slot 7, provided in the flange 4, which also has knife-edges 8, forming a continuation of the edge 6.

The operation of my improved wick-trimmer is as follows: When it is desired to remove the burned portion of the wick, the chimney is removed and the trimmer placed down over the burner, so that the disk forming the top of the device will rest upon the top of the burner and the top of the wick, while the depending flange will extend down over the sides of the wick, and by grasping the handle provided on the top of the disk and revolving the device the sharpened edges of the recess and slot will engage the sides and top of the wick, thoroughly and quickly removing all burned portions of the wick and leaving a smooth uniform surface, so that a regular uniform flame will be obtained when the lamp is lighted.

I have shown and described the device composed of cast metal; but I do not wish to confine myself to this construction, as it may be made of wood, glass, or any other suitable material, and the details of construction may be varied to a considerable extent, and I therefore do not wish to confine myself to the specific construction herein shown.

I claim as my invention—

1. As a new article of manufacture, a circular-wick trimmer comprising a disk, a handle therefor, a recess having sharpened edges provided in said disk, a depending flange provided on said disk and having a slot provided with sharpened edges and communicating with said recess, substantially as described.

2. A circular-wick trimmer, comprising a disk 2 having a handle 3 and a depending flange 4, a recess 5 provided in said disk having a knife-edge 6 and a vertical slot 7 provided in said flange and communicating with said recess and having a knife-edge 8, forming a continuation of said knife-edge 6, substantially as described.

3. A circular-wick trimmer, comprising a disk 2 having a handle 3 and a depending flange 4 adapted to fit down over a circular wick, said flange being provided with a slot 7, the edges of said slot being drawn down to a knife-edge whereby when the disk and flange are revolved in either direction, the edges of the slot will engage the upper portion of the wick and remove the burned or charred portions therefrom, substantially as described.

FRANK P. MORNEAU.

Witnesses:
J. VAN VALKENBURG,
EDWARD E. SMITH.